United States Patent
Hosseini et al.

(10) Patent No.: US 12,224,865 B2
(45) Date of Patent: Feb. 11, 2025

(54) CODEBOOK GENERATION FOR SPS WITH DELAYED HARQ

(71) Applicant: QUALCOMM Incorporated, San Diego, CA (US)

(72) Inventors: Seyedkianoush Hosseini, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/477,388

(22) Filed: Sep. 16, 2021

(65) Prior Publication Data

US 2022/0094483 A1   Mar. 24, 2022

Related U.S. Application Data

(60) Provisional application No. 63/080,632, filed on Sep. 18, 2020.

(51) Int. Cl.
*H04L 1/1812* (2023.01)
*H04L 1/1607* (2023.01)
*H04L 1/1829* (2023.01)
*H04W 72/0446* (2023.01)
*H04W 72/21* (2023.01)
*H04W 72/1268* (2023.01)

(52) U.S. Cl.
CPC ......... *H04L 1/1812* (2013.01); *H04L 1/1671* (2013.01); *H04L 1/1854* (2013.01); *H04L 1/1861* (2013.01); *H04L 1/1864* (2013.01); *H04W 72/0446* (2013.01); *H04W 72/21* (2023.01); *H04W 72/1268* (2013.01)

(58) Field of Classification Search
CPC ............ H04W 72/0446; H04W 72/23; H04W 72/0466; H04W 72/21; H04W 72/1268; H04L 1/1812; H04L 1/1861; H04L 1/1854; H04L 1/1671; H04L 1/1864
See application file for complete search history.

(56) References Cited

U.S. PATENT DOCUMENTS

2020/0106569 A1* 4/2020 Tsai ................. H04W 72/23
2020/0170004 A1* 5/2020 Si .................... H04W 72/02

FOREIGN PATENT DOCUMENTS

WO   WO-2017028001 A1 * 2/2017 ........... H04L 1/1614

OTHER PUBLICATIONS

3GPP, "Other aspects for ULL—IIOT enhancements", Nov. 18, 2019-Nov. 22, 2019, 3GPP TSG RAN WG1 Meeting #99 (Year: 2019).*

(Continued)

*Primary Examiner* — Kwang B Yao
*Assistant Examiner* — Bradley D Lytle, Jr.
(74) *Attorney, Agent, or Firm* — Procopio, Cory, Hargreaves & Savitch

(57) ABSTRACT

Method and apparatus to generate a HARQ-ACK codebook for a delayed PUCCH transmission for a future valid occasion. The apparatus determines that a scheduled transmission of a first UCI in a first PUCCH is within a first slot including invalid symbols for transmission. The apparatus configures a second UCI in a second PUCCH within a second slot subsequent to the first slot. The apparatus generates a feedback codebook including the second UCI and the first UCI. The apparatus transmits the feedback codebook in the second PUCCH within the second slot.

29 Claims, 8 Drawing Sheets

(56) References Cited

OTHER PUBLICATIONS

3GPP, "Discussion on PUSCH resource collision and DL SPS enhancement", Nov. 18, 2019-Nov. 22, 2019, 3GPP TSG RAN WG1 Meeting #99 (Year: 2019).*
CATT: "Discussion on PUSCH Resource Collision and DL SPS Enhancement", 3GPP TSG RAN WG1 Meeting #99, R1-1912174, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823252, 7 Pages, Figure 5, Section 3.1.
Huawei, et al., "Other Aspects for URLLC/IIOT Enhancements", 3GPP TSG RAN WG1 Meeting #99, R1-1912919, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, 6 Pages, Nov. 9, 2019, XP051823682, the whole document.
International Search Report and Written Opinion—PCT/US2021/050972—ISA/EPO—Sep. 21, 2022.

* cited by examiner

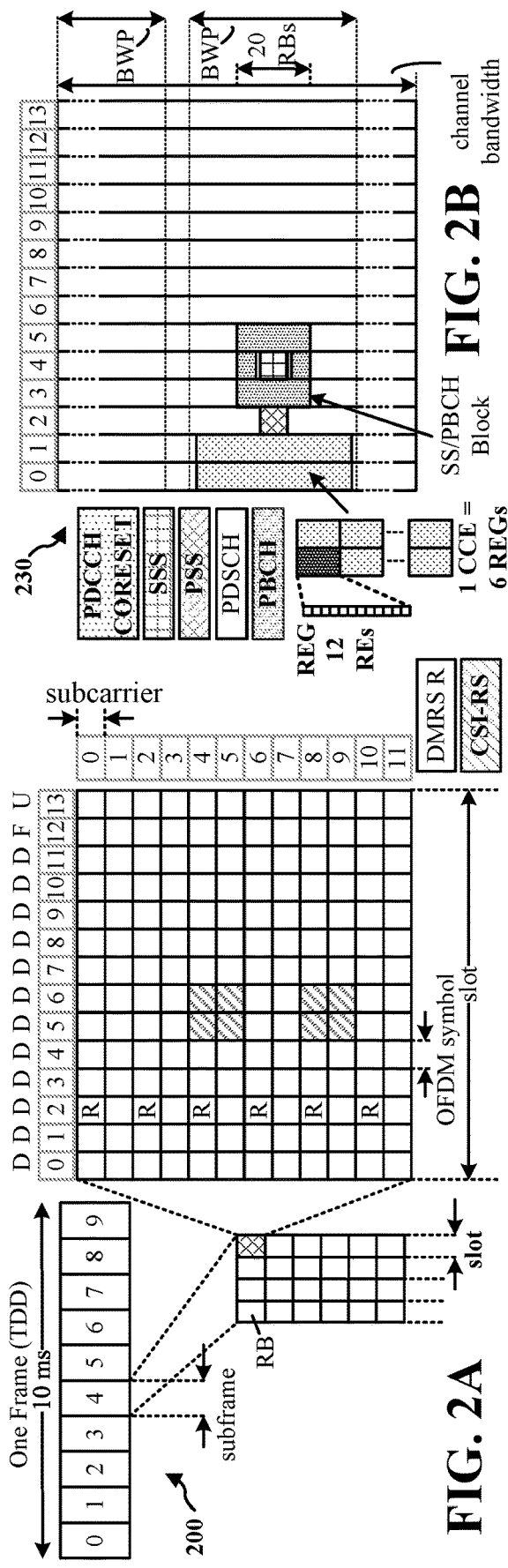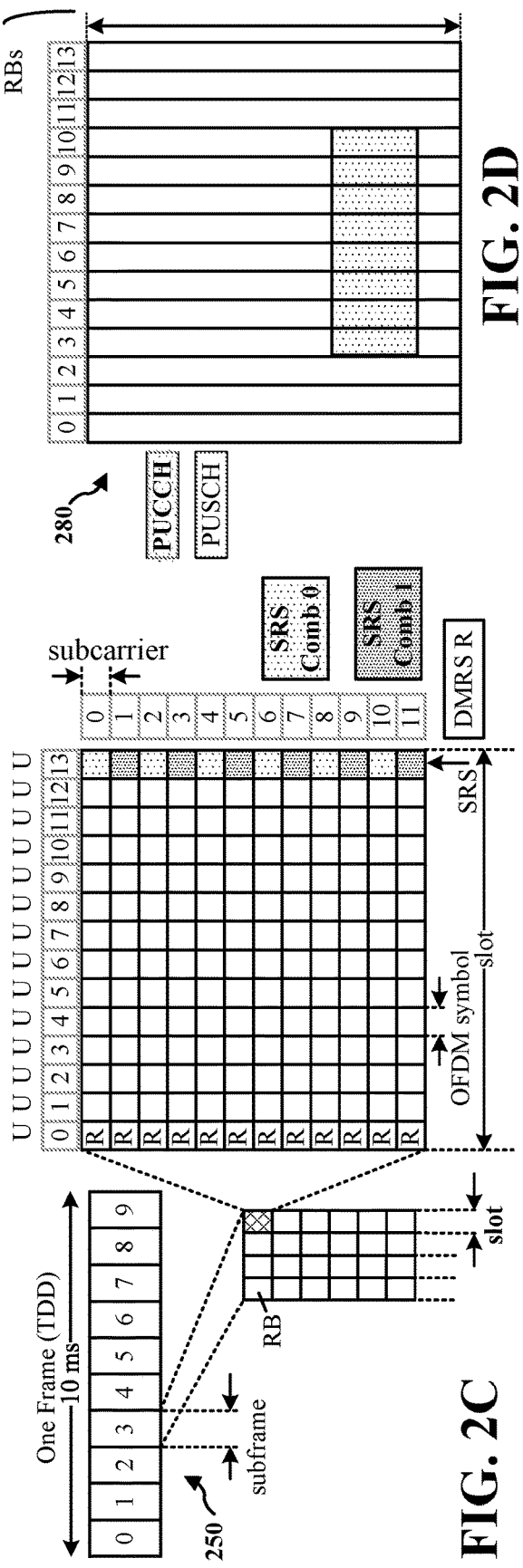

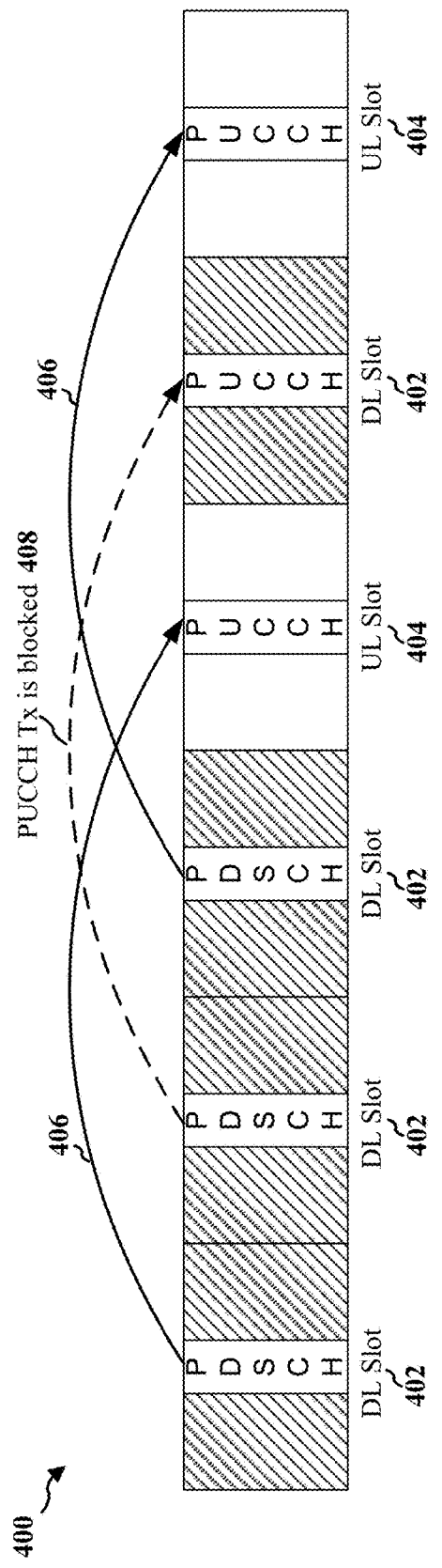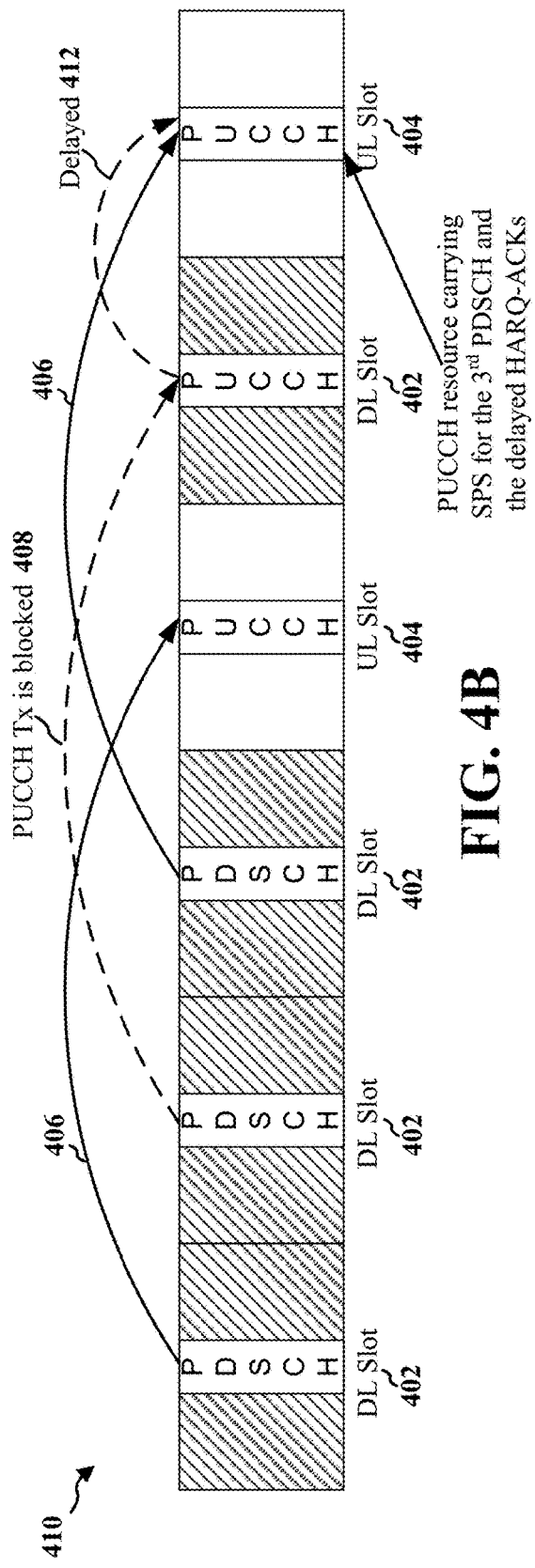

CODEBOOK GENERATION FOR SPS WITH DELAYED HARQ

CROSS REFERENCE TO RELATED APPLICATION(S)

This application claims the benefit of and priority to U.S. Provisional Application Ser. No. 63/080,632, entitled "Codebook Generation for SPS with Delayed HARQ" and filed on Sep. 18, 2020, which is expressly incorporated by reference herein in its entirety.

TECHNICAL FIELD

The present disclosure relates generally to communication systems, and more particularly, to a configuration for codebook generation for semi-persistent scheduling (SPS) with delayed hybrid automatic repeat request (HARQ).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may determine that a scheduled transmission of a first uplink control information (UCI) in a first physical uplink control channel (PUCCH) is within a first slot. The scheduled transmission is cancelled. The apparatus may configure a second UCI in a second PUCCH within a second slot subsequent to the first slot. The apparatus may generate a feedback codebook including the second UCI and the first UCI. The apparatus may transmit the feedback codebook in the second PUCCH within the second slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A-4B illustrate examples of an SPS configuration.

DETAILED DESCRIPTION

Figure 1:
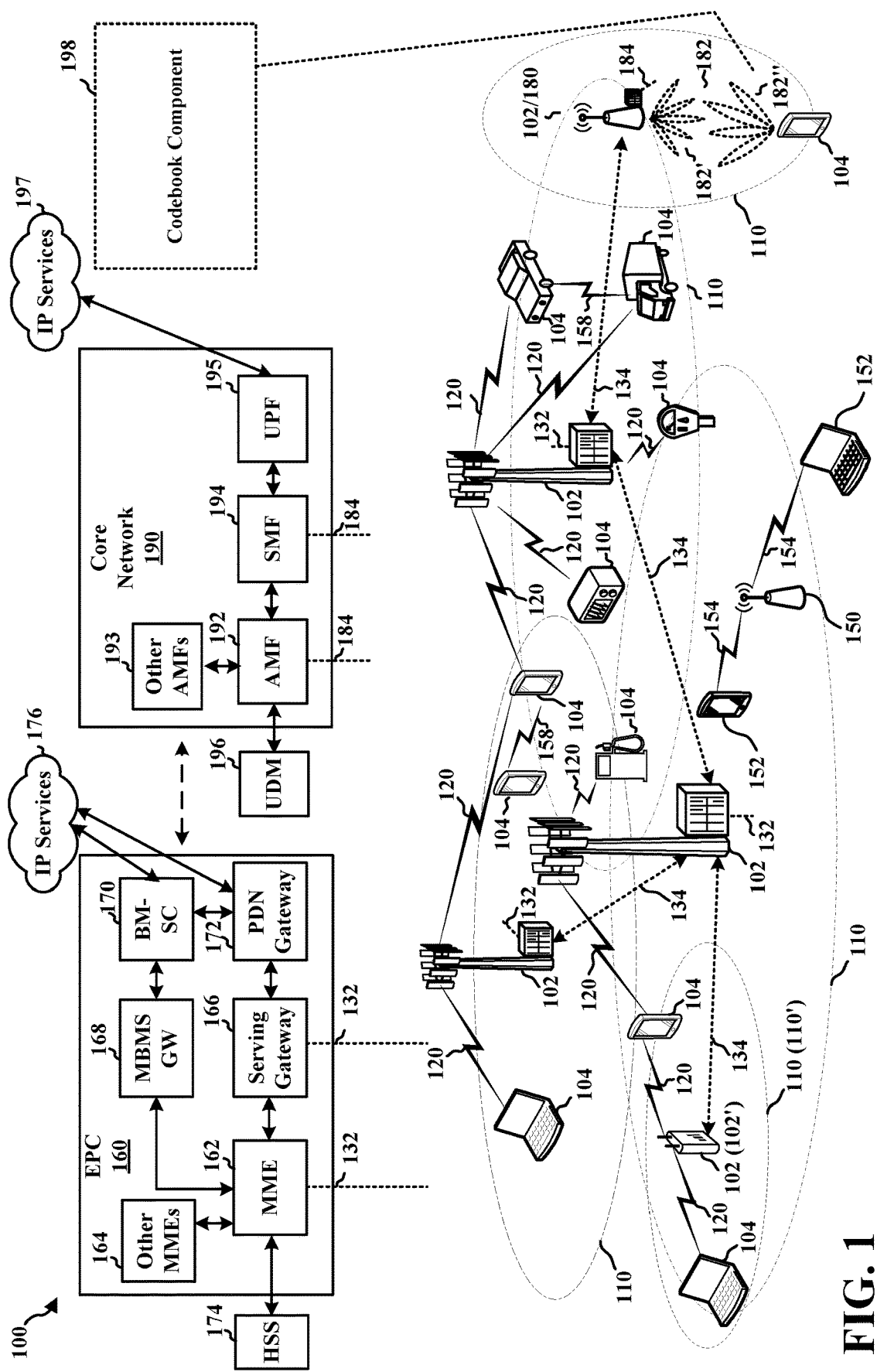
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to generate a feedback codebook for a delayed PUCCH transmission for a future valid occasion. For example, the UE 104 may comprise a codebook component 198 configured to generate a feedback codebook including a first UCI and a second UCI. The UE 104 may determine that a scheduled transmission of a first UCI in a first PUCCH is within a first slot. The scheduled transmission is cancelled. The UE 104 may configure a second UCI in a second PUCCH within a second slot subsequent to the first slot. The UE 104 may generate a feedback codebook including the second UCI and the first UCI. The UE 104 may transmit the feedback codebook in the second PUCCH within the second slot.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
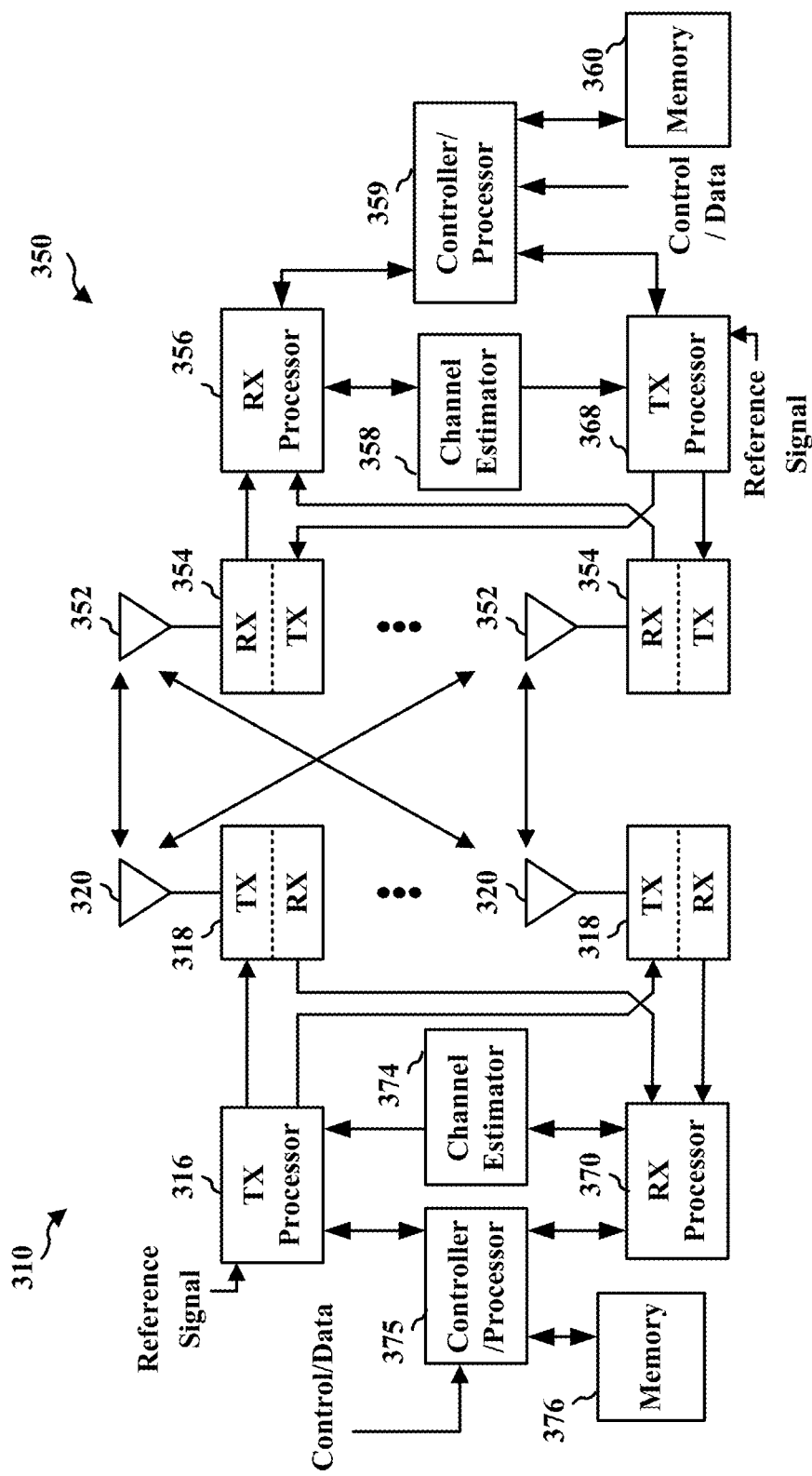
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In wireless communication systems, a UE may be configured with one or more SPS configurations. For each SPS configuration, a HARQ-ACK feedback timeline (K1) may be given in a DCI format to activate the SPS configuration. If the field is not included in the DCI, K1 may be provided by an RRC parameter (e.g., dl-DataToUL-ACK). The PUCCH resource to be used for SPS PDSCH occasions of a given SPS configurations may be determined based on the activating DCI. For example, for a first PDSCH after receipt of an activating DCI, the PUCCH resource may be determined by a PUCCH resource indicator (PRI) in the activating DCI. For all other PDSCH occasions, the PUCCH resource may be given by an RRC parameter (e.g., SPS-PUCCH-A/N). However, in some instances, for some SPS occasions, K1 and/or dynamic/semi-static PRI may point to a PUCCH resource that is not valid for PUCCH transmissions.

For example, with reference to the example 400 of FIG. 4A, an SPS configuration with a periodicity of one slot is shown, and K1 is set to 3 slots. The example 400 of FIG. 4A includes a plurality of DL slots 402 and UL slots 404, where a PDSCH may be received in a DL slot 402, and a PUCCH slot may be transmitted in a UL slot 404. The example 400 discloses that for the first PDSCH, the K1 406 points to a UL slot 404, such that the PUCCH resource carrying SPS for the first PDSCH configured to be transmitted in the first UL slot 404. With regard to the second PDSCH, the K1 408 points to a semi-static DL slot 402. The semi-static DL slot 402 is not a valid slot to transmit a PUCCH. As such, the PUCCH transmission for the second PDSCH is not compatible with the scheduled slot, and the HARQ-ACK may not be transmitted. Thus, the PUCCH resource for the SPS collides with the invalid symbol and will be dropped. This approach may be costly for TDD bands where all the SPS PDSCHs for which the HARQ-ACK is dropped would have to be retransmitted. The same situation may occur if K1 and PM point to a PUCCH resource which is partially invalid for transmission, such as where some of the symbols of the PUCCH resource overlap with semi-static DL symbols and/or flexible symbols.

Aspects presented herein provide a configuration for codebook generate for SPS with a delayed HARQ. For example, aspects presented herein may allow a UE to generate a HARQ-ACK codebook for a delayed PUCCH transmission for a future valid occasion. At least one advantage of the disclosure is that in instances where the PUCCH resource for the SPS collides with an invalid symbol, instead of being dropped, the PUCCH transmission may be delayed to a future valid occasion.

With reference to example 410 of FIG. 4B, which may be configured in a manner similar to FIG. 4A. The example 410 may have the SPS configuration with a periodicity of one slot, and a K1 set to 3 slots, similarly as in FIG. 4A. The example 410 discloses that for the first PDSCH, the K1 406 points to a UL slot 404, such that the PUCCH resource carrying SPS for the first PDSCH configured to be transmitted in the first UL slot 404. With regard to the second PDSCH, the K1 408 points to a semi-static DL slot 402. The semi-static DL slot 402 is not a valid slot to transmit a PUCCH carrying the HARQ-ACK. However, instead of the HARQ-ACK being dropped, the HARQ-ACK transmission may be delayed to a future valid occasion, as shown at 412 of FIG. 4B, which may be the second UL slot 404. The UE may be configured to generate a HARQ-ACK codebook for the delayed HARQ-ACK transmission.

In some aspects, the delayed PUCCH transmission may point to a slot that corresponds to another PDSCH. For example, as shown in FIG. 4B, the K1 406 of the third PDSCH points to the second UL slot 404, which may also include the delayed HARQ-ACK transmission. In such aspects, the PUCCH resource may carry the SPS for the third PDSCH and the delayed HARQ-ACK transmission.

A UE may receive an SPS configuration and if the UE reports a HARQ-ACK information in a PUCCH only for SPS PDSCH reception, then the UE may fix the carrier c and the SPS configuration s on a carrier. The UE may generate a HARQ-ACK bit for each number of DL slots for PDSCH reception with HARQ-ACK information multiplexed on the PUCCH, which may run from 0 to $N_c^{DL}-1$, where $N_c^{DL}$ is the number of DL slots for SPS PDSCH reception on a serving cell c with HARQ-ACK information multiplexed on the PUCCH. The UE may loop over the DL slots, and then over SPS configurations, and then over DL carriers.

The UE may generate the HARQ-ACK bits for the cancelled PUCCH transmission, as if the PUCCH were not cancelled. The UE may then append the generated HARQ-ACK information to the new HARQ bit sequence in order to generate a HARQ-ACK codebook for transmission. The generated HARQ-ACK codebook may be transmitted in a second PUCCH within a second slot, wherein the second slot is subsequent the slot of the cancelled PUCCH transmission. The UE may append the HARQ information bits for the cancelled PUCCH transmission in different manners. In some aspects, the HARQ information bits may be appended per carrier. For example, for each carrier, the old bits for all the SPS configurations may be appended with all the new bits for all the SPS configurations, and then move to the next carrier. In another example, for each carrier, the new bits for all the SPS configurations may be appended with all the old bits for all the SPS configurations, and then move to the next carrier. In some aspects, the UE may generate a new PUCCH HARQ sequence followed by the old PUCCH HARQ sequence. In some aspects, the old HARQ information may be appended for each SPS configuration or carrier. For example, the old HARQ information may be appended to an end of the new HARQ information. In such instances, the combination of the old and new HARQ information may comprise appending, for each serving cell c of a set of serving cells configured to the UE and for each SPS PDSCH configuration s of a set of SPS PDSCH configurations configured to the UE of the serving cell c, the old HARQ information for the serving cell c and the SPS PDSCH configuration s to an end of the new HARQ information for the serving cell c and the SPS PDSCH configuration s. In some aspects, the old HARQ information may be appended to a beginning of the new HARQ information. For example, the combination of the old and new HARQ information may comprise appending, for each serving cell c of a set of serving cells configured to the UE and for each SPS PDSCH configuration s of a set of SPS PDSCH configurations configured to the UE of the serving cell c, the old HARQ information for the serving cell c and the SPS PDSCH configuration s to a beginning of the new HARQ information for the serving cell c and the SPS PDSCH configuration s. In some aspects, the old HARQ information may be comprised of a plurality of old HARQ information from different slots, where each of plurality of old HARQ information corresponds to a delayed HARQ-ACK transmission. The old HARQ information or the plurality of old HARQ information may be multiplexed with the new HARQ information. In instances where the plurality of old HARQ information is multiplexed with the new HARQ information, the plurality of old HARQ information may be multiplexed with the new HARQ information in a slot n, wherein the ordering of the multiplexed HARQ information may be based on a slot index. The slot index may correspond to the respective slot for each of the plurality of old HARQ information. The combination of the old HARQ information and the new HARQ information may generate a HARQ-ACK codebook for transmission.

In some aspects, generating the HARQ-ACK codebook may comprise generating the HARQ-ACK codebook based on the DL slot for SPS PDSCH reception with HARQ-ACK information multiplexed on a first or cancelled PUCCH and with HARQ-ACK information multiplexed on a second or subsequent PUCCH. In some aspects, generating the HARQ-ACK codebook may comprise generating the HARQ-ACK codebook based on DL slots including a first DL slot on which a first SPS PDSCH is received and a second DL slot on which a second SPS PDSCH is received. The HARQ-ACK codebook may be based on HARQ-ACK information including the first or cancelled HARQ-ACK information associated with the first DL slot and the second or subsequent HARQ-ACK information associated with the second DL slot. In such aspects, a new HARQ-ACK feedback timeline may be defined K1', wherein K1' is the original K1 plus an offset for the PDSCHs whose HARQ-ACK is scheduled on the DL slot. The new K1' may be utilized to generate the HARQ-ACK codebook for such SPS PDSCHs.

Figure 5:
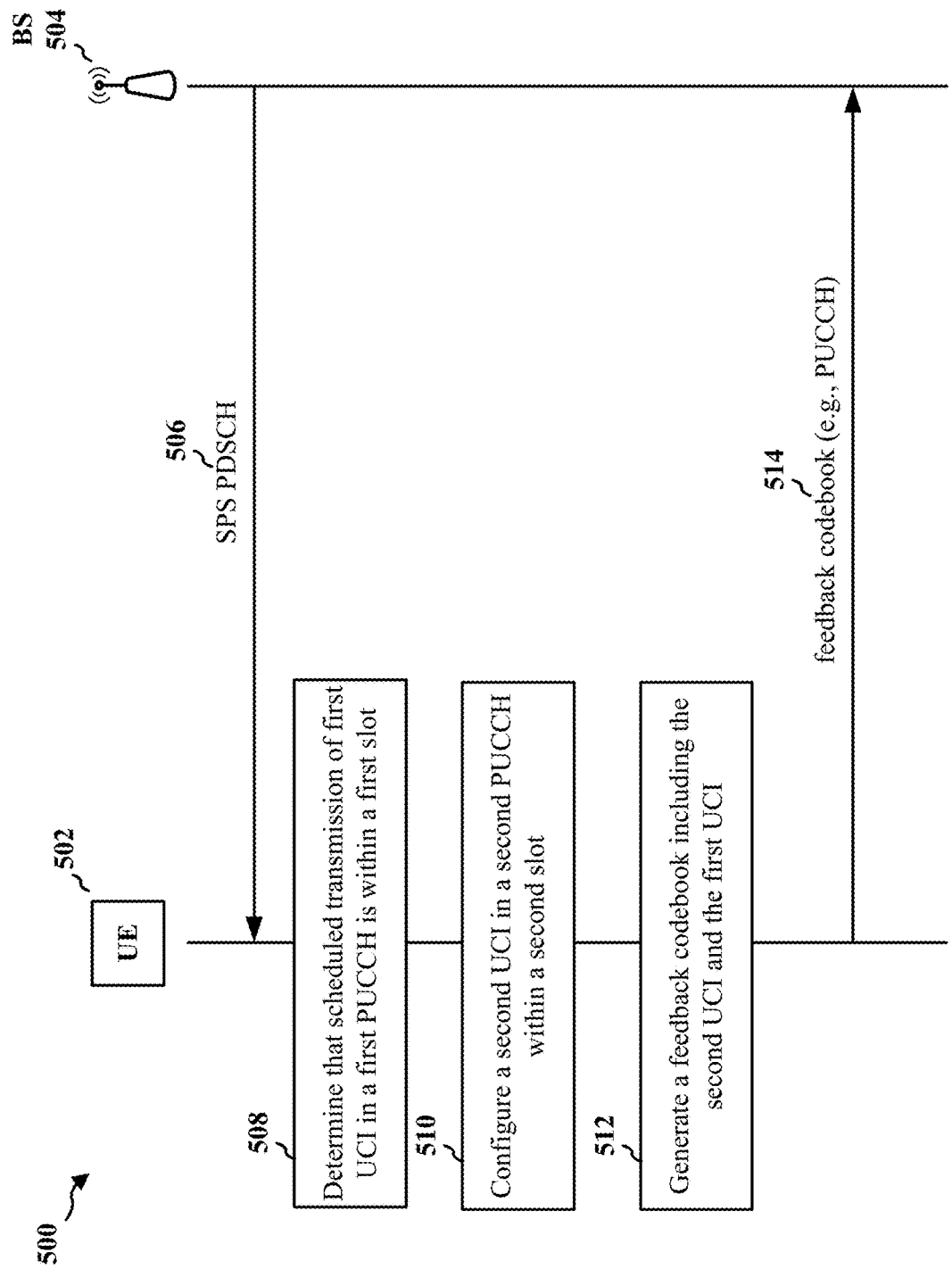
FIG. 5 is a call flow diagram of signaling between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350.

As illustrated at 508, the UE 502 may determine that a scheduled transmission of a first UCI in a first PUCCH is within a first slot. For example, the UE 502 may determine that a scheduled transmission of first HARQ-ACK information in a first PUCCH is within a first slot. The UE 502 may determine that the scheduled transmission of the first UCI (e.g., HARQ-ACK information) in the first PUCCH within the first slot includes invalid symbols for the transmission, such that the scheduled transmission is cancelled. The scheduled transmission may be cancelled based on a collision with the invalid symbols. The UE may determine the scheduled transmission of the first UCI (e.g., HARQ-ACK information) in the first PUCCH within the first slot in response to a received first SPS PDSCH 506. The UE 502 may receive the first SPS PDSCH (e.g., SPS PDSCH 506) from the base station 504.

As illustrated at 510, the UE 502 may configure a second UCI in a second PUCCH within a second slot. For example, the UE 502 may determine to transmit second HARQ-ACK information in a second PUCCH. The UE 502 may determine to transmit the second UCI (e.g., HARQ-ACK information) in the second PUCCH within a second slot subsequent to the first slot. The UE 502 may configure the second UCI (e.g., HARQ-ACK information) in the second PUCCH in response to a received second SPS PDSCH (e.g., SPS PDSCH 506).

As illustrated at 512, the UE 502 may generate a feedback codebook including the second UCI and the first UCI. For example, the UE 502 may generate a feedback codebook (e.g., HARQ-ACK codebook) including the second UCI (e.g., HARQ-ACK information) and the first UCI (e.g., HARQ-ACK information). In some aspects, to generate the feedback codebook (e.g., HARQ-ACK codebook), the UE 502 may generate the feedback codebook (e.g., HARQ-ACK codebook) based on DL slots for SPS PDSCH reception with HARQ-ACK information multiplexed on the first PUCCH and with HARQ-ACK information multiplexed on the second PUCCH. In some aspects, to generate the feedback codebook (e.g., HARQ-ACK codebook), the UE 502 may generate the HARQ-ACK codebook based on DL slots including a first DL slot on which the first SPS PDSCH is received and a second DL slot on which the second SPS PDSCH is received. The UE 502 may generate the HARQ-ACK codebook based on HARQ-ACK information including the first UCI associated with the first DL slot and the second UCI associated with the second DL slot.

In some aspects, the UE 502, to generate the feedback codebook, may generate a first HARQ-ACK codebook. The UE 502 may generate the first HARQ-ACK codebook based on the first UCI multiplexed on the first PUCCH.

In some aspects, the UE 502, to generate the feedback codebook, may generate a second HARQ-ACK codebook. The UE 502 may generate the second HARQ-ACK codebook based on the second UCI multiplexed on the second PUCCH.

In some aspects, the UE 502, to generate the HARQ-ACK codebook, may combine the first HARQ-ACK codebook and the second HARQ-ACK codebook to generate the feedback codebook for transmission. In some aspects, to combine the first HARQ-ACK codebook and the second HARQ-ACK codebook to generate the feedback codebook, the UE 502 may append the first HARQ-ACK codebook to an end of the second HARQ-ACK codebook. In some aspects, to combine the first HARQ-ACK codebook and the second HARQ-ACK codebook to generate the feedback codebook, the UE 502 may append, for each serving cell c of a set of serving cells configured to the UE 502 and for each SPS PDSCH configuration s of a set of SPS PDSCH configurations configured to the UE 502 for the serving cell c, the first HARQ-ACK codebook for the serving cell c and the SPS PDSCH configuration s to an end of the second HARQ-ACK codebook for the serving cell c and the SPS PDSCH configuration s. In some aspects, to combine the first HARQ-ACK codebook and the second HARQ-ACK codebook to generate the feedback codebook, the UE 502 may append, for each serving cell c of a set of serving cells configured to the UE 502, a first set of HARQ-ACK codebooks for the serving cell c to an end of a second set of HARQ-ACK codebooks for the serving cell c. The first set of HARQ-ACK codebooks for the serving cell c may include the first HARQ-ACK codebook for the serving cell c for each SPS PDSCH configuration s of a set of SPS PDSCH configurations configured to the UE 502 for the serving cell c. The second set of HARQ-ACK codebooks for the serving cell c may include the second HARQ-ACK codebook for the serving cell c for each SPS PDSCH configuration s of the set of SPS PDSCH configurations configured to the UE 502 for the serving cell c. In some aspects, to combine the first HARQ-ACK codebook and the second HARQ-ACK codebook to generate the feedback codebook, the UE 502 may append the first HARQ-ACK codebook to a beginning of the second HARQ-ACK codebook. In some aspects, to combine the first HARQ-ACK codebook and the second HARQ-ACK codebook to generate the feedback codebook, the UE 502 may append, for each serving cell c of a set of serving cells configured to the UE 502 and for each SPS PDSCH configuration s of a set of SPS PDSCH configurations configured to the UE 502 for the serving cell c, the first HARQ-ACK codebook for the serving cell c and the SPS PDSCH configuration s to a beginning of the second HARQ-ACK codebook for the serving cell c and the SPS PDSCH configuration s. In some aspects, to combine the first HARQ-ACK codebook and the second HARQ-ACK codebook to generate the feedback codebook, the UE 502 may append, for each serving cell c of a set of serving cells configured to the UE 502, a first set of HARQ-ACK codebooks to a beginning of a second set of HARQ-ACK codebooks. The first set of HARQ-ACK codebooks may include the first HARQ-ACK codebook for the serving cell c for each SPS PDSCH configuration s of a set of SPS PDSCH configurations configured to the UE 502 for the serving cell c. The second set of HARQ-ACK codebooks may include the second HARQ-ACK codebook for the serving cell c for each SPS PDSCH configuration s of the set of SPS PDSCH configurations configured to the UE 502 for the serving cell c.

As illustrated at 514, the UE 502 may transmit the feedback codebook. The UE 502 may transmit the feedback codebook in the second PUCCH within the second slot. The UE 502 may transmit the feedback codebook to the base station 504. The base station 504 may receive the feedback codebook from the UE 502.

Figure 6:
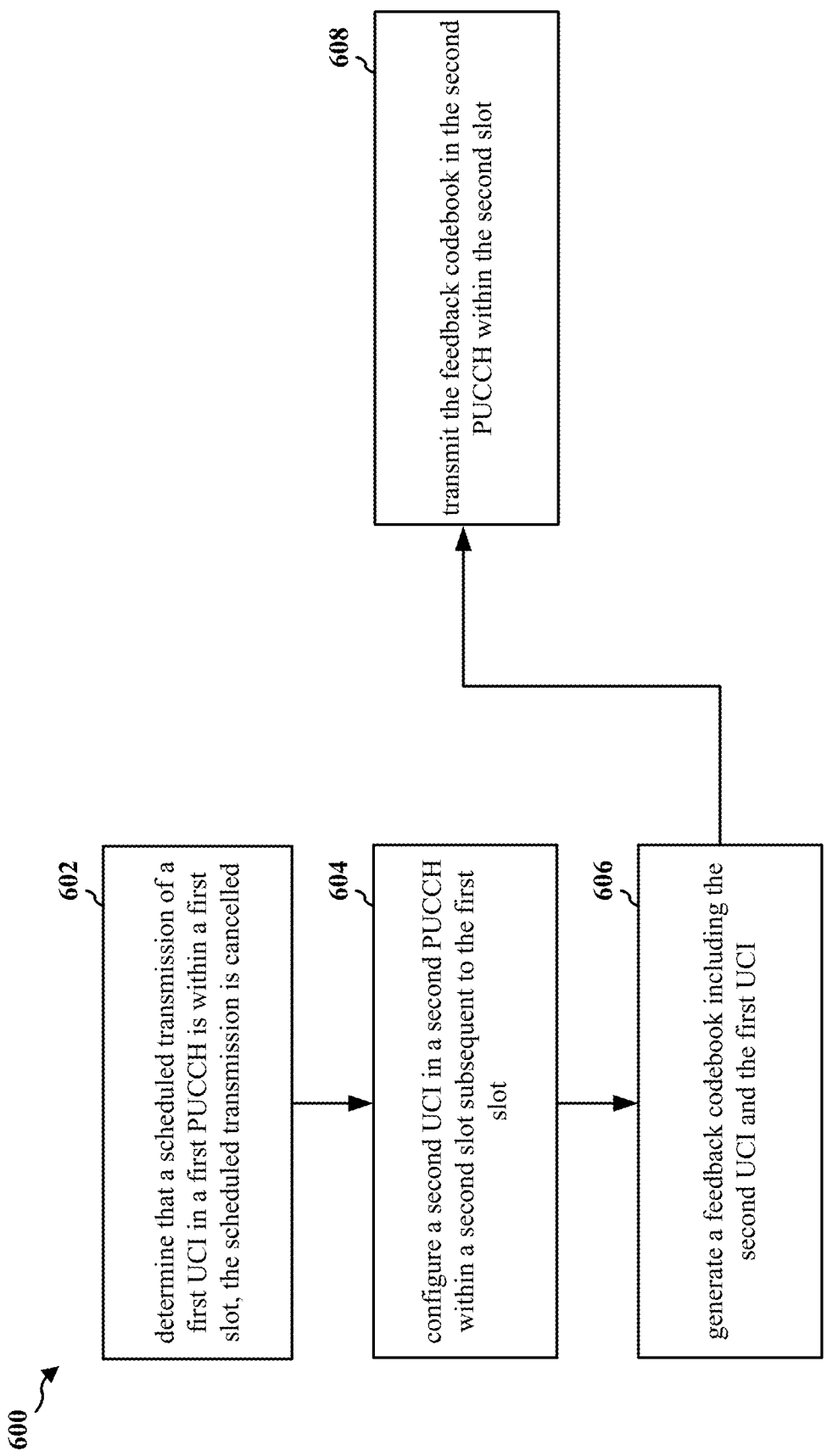
FIG. 6 is a flowchart of a method of wireless communication.

FIG. 6 is a flowchart 600 of a method of wireless communication. The method may be performed by a UE or a component of a UE (e.g., the UE 104; the apparatus 802; the cellular baseband processor 804, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to generate a feedback codebook for a delayed PUCCH transmission for a future valid occasion.

At 602, the UE may determine that a scheduled transmission of a first UCI in a first PUCCH is within a first slot. For example, 602 may be performed by determination component 840 of apparatus 802. For example, the UE may determine that a scheduled transmission of first HARQ-ACK information in a first PUCCH is within a first slot. The UE may determine that the scheduled transmission of the first UCI (e.g., HARQ-ACK information) in the first PUCCH within the first slot includes invalid symbols for the transmission, such that the scheduled transmission is cancelled. The scheduled transmission may be cancelled based on a collision with the invalid symbols. The UE may determine the scheduled transmission of the first UCI (e.g., HARQ-ACK information) in the first PUCCH within the first slot in response to a received first SPS PDSCH.

At 604, the UE may configure a second UCI in a second PUCCH within a second slot. For example, 604 may be performed by determination component 840 of apparatus 802. For example, the UE may determine to transmit second HARQ-ACK information in a second PUCCH. The UE may determine to transmit the second UCI (e.g., HARQ-ACK information) in the second PUCCH within a second slot subsequent to the first slot. In some aspects, the second slot being subsequent to the first slot may comprise the slot immediately after the first slot. In some aspects, the second slot being subsequent to the first slot may comprise at least one intervening slot between the first slot and the second slot. The UE may configure the second UCI (e.g., HARQ-ACK information) in the second PUCCH in response to a received second SPS PDSCH.

At 606, the UE may generate a feedback codebook including the second UCI and the first UCI. For example, 606 may be performed by codebook component 842 of apparatus 802. For example, the UE may generate a feedback codebook (e.g., HARQ-ACK codebook) including the second UCI (e.g., HARQ-ACK information) and the first UCI (e.g., HARQ-ACK information). In some aspects, to generate the feedback codebook (e.g., HARQ-ACK codebook), the UE may generate the feedback codebook (e.g., HARQ-ACK codebook) based on DL slots for SPS PDSCH reception with HARQ-ACK information multiplexed on the first PUCCH and with HARQ-ACK information multiplexed on the second PUCCH. In some aspects, to generate the feedback codebook (e.g., HARQ-ACK codebook), the UE may generate the HARQ-ACK codebook based on DL slots including a first DL slot on which the first SPS PDSCH is received and a second DL slot on which the second SPS PDSCH is received. The UE may generate the HARQ-ACK codebook based on HARQ-ACK information including the first UCI associated with the first DL slot and the second UCI associated with the second DL slot.

At 608, the UE may transmit the feedback codebook. For example, 608 may be performed by PUCCH component 846 of apparatus 802. The UE may transmit the feedback codebook in the second PUCCH within the second slot.

Figure 7:
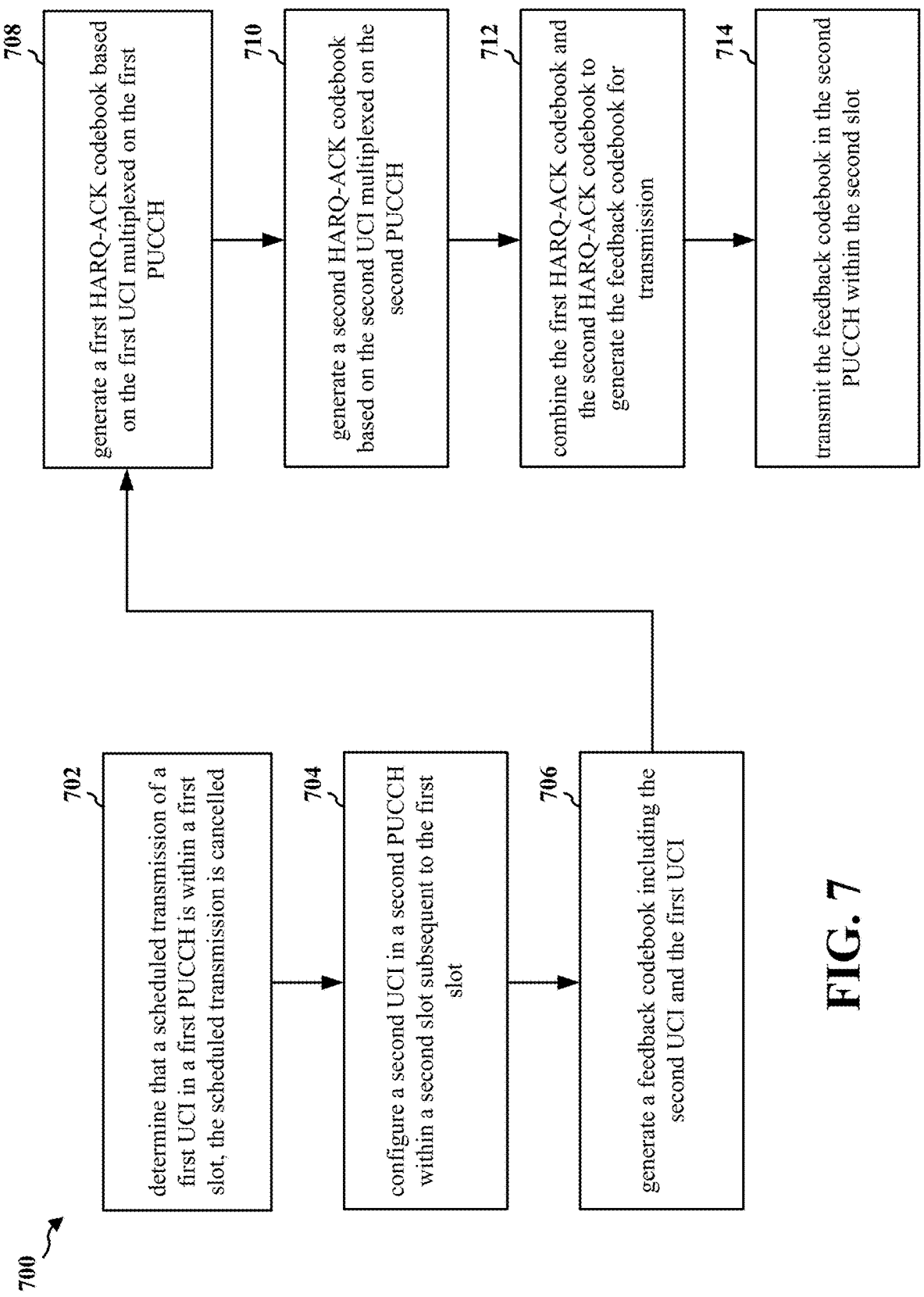
FIG. 7 is a flowchart of a method of wireless communication.

FIG. 7 is a flowchart 700 of a method of wireless communication. The method may be performed by a UE or a component of a UE (e.g., the UE 104; the apparatus 802; the cellular baseband processor 804, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to generate a feedback codebook for a delayed PUCCH transmission for a future valid occasion.

At 702, the UE may determine that a scheduled transmission of a first UCI in a first PUCCH is within a first slot. For example, 702 may be performed by determination component 840 of apparatus 802. For example, the UE may determine that a scheduled transmission of first HARQ-ACK information in a first PUCCH is within a first slot. The UE may determine that the scheduled transmission of the first UCI (e.g., HARQ-ACK information) in the first PUCCH within the first slot includes invalid symbols for the transmission, such that the scheduled transmission is cancelled. The scheduled transmission may be cancelled based on a collision with the invalid symbols. The UE may determine the scheduled transmission of the first UCI (e.g., HARQ-ACK information) in the first PUCCH within the first slot in response to a received first SPS PDSCH.

At 704, the UE may configure a second UCI in a second PUCCH within a second slot. For example, 704 may be performed by determination component 840 of apparatus 802. For example, the UE may determine to transmit second HARQ-ACK information in a second PUCCH. The UE may determine to transmit the second UCI (e.g., HARQ-ACK information) in the second PUCCH within a second slot subsequent to the first slot. In some aspects, the second slot being subsequent to the first slot may comprise the slot immediately after the first slot. In some aspects, the second slot being subsequent to the first slot may comprise at least one intervening slot between the first slot and the second slot. The UE may configure the second UCI (e.g., HARQ-ACK information) in the second PUCCH in response to a received second SPS PDSCH.

At 706, the UE may generate a feedback codebook including the second UCI and the first UCI. For example, 706 may be performed by codebook component 842 of apparatus 802. For example, the UE may generate a feedback codebook (e.g., HARQ-ACK codebook) including the second UCI (e.g., HARQ-ACK information) and the first UCI (e.g., HARQ-ACK information). In some aspects, to generate the feedback codebook (e.g., HARQ-ACK codebook), the UE may generate the feedback codebook (e.g., HARQ-ACK codebook) based on DL slots for SPS PDSCH reception with HARQ-ACK information multiplexed on the first PUCCH and with HARQ-ACK information multiplexed on the second PUCCH. In some aspects, to generate the feedback codebook (e.g., HARQ-ACK codebook), the UE may generate the HARQ-ACK codebook based on DL slots including a first DL slot on which the first SPS PDSCH is received and a second DL slot on which the second SPS PDSCH is received. The UE may generate the HARQ-ACK codebook based on HARQ-ACK information including the first UCI associated with the first DL slot and the second UCI associated with the second DL slot.

At 708, the UE, to generate the feedback codebook, may generate a first HARQ-ACK codebook. For example, 708 may be performed by codebook component 842 of apparatus 802. The UE may generate the first HARQ-ACK codebook based on the first UCI multiplexed on the first PUCCH.

At 710, the UE, to generate the feedback codebook, may generate a second HARQ-ACK codebook. For example, 710 may be performed by codebook component 842 of apparatus 802. The UE may generate the second HARQ-ACK codebook based on the second UCI multiplexed on the second PUCCH.

At 712, the UE, to generate the HARQ-ACK codebook, may combine the first HARQ-ACK codebook and the second HARQ-ACK codebook to generate the feedback codebook for transmission. For example, 712 may be performed by combination component 844 of apparatus 802. In some aspects, to combine the first HARQ-ACK codebook and the second HARQ-ACK codebook to generate the feedback codebook, the UE may append the first HARQ-ACK codebook to an end of the second HARQ-ACK codebook. In some aspects, to combine the first HARQ-ACK codebook and the second HARQ-ACK codebook to generate the feedback codebook, the UE may append, for each serving cell c of a set of serving cells configured to the UE and for each SPS PDSCH configuration s of a set of SPS PDSCH configurations configured to the UE for the serving cell c, the first HARQ-ACK codebook for the serving cell c and the SPS PDSCH configuration s to an end of the second HARQ-ACK codebook for the serving cell c and the SPS PDSCH configuration s. In some aspects, to combine the first HARQ-ACK codebook and the second HARQ-ACK codebook to generate the feedback codebook, the UE may append, for each serving cell c of a set of serving cells configured to the UE, a first set of HARQ-ACK codebooks for the serving cell c to an end of a second set of HARQ-ACK codebooks for the serving cell c. The first set of HARQ-ACK codebooks for the serving cell c may include the first HARQ-ACK codebook for the serving cell c for each SPS PDSCH configuration s of a set of SPS PDSCH configurations configured to the UE for the serving cell c. The second set of HARQ-ACK codebooks for the serving cell c may include the second HARQ-ACK codebook for the serving cell c for each SPS PDSCH configuration s of the set of SPS PDSCH configurations configured to the UE for the serving cell c. In some aspects, to combine the first HARQ-ACK codebook and the second HARQ-ACK codebook to generate the feedback codebook, the UE may append the first HARQ-ACK codebook to a beginning of the second HARQ-ACK codebook. In some aspects, to combine the first HARQ-ACK codebook and the second HARQ-ACK codebook to generate the feedback codebook, the UE may append, for each serving cell c of a set of serving cells configured to the UE and for each SPS PDSCH configuration s of a set of SPS PDSCH configurations configured to the UE for the serving cell c, the first HARQ-ACK codebook for the serving cell c and the SPS PDSCH configuration s to a beginning of the second HARQ-ACK codebook for the serving cell c and the SPS PDSCH configuration s. In some aspects, to combine the first HARQ-ACK codebook and the second HARQ-ACK codebook to generate the feedback codebook, the UE may append, for each serving cell c of a set of serving cells configured to the UE, a first set of HARQ-ACK codebooks to a beginning of a second set of HARQ-ACK codebooks. The first set of HARQ-ACK codebooks may include the first HARQ-ACK codebook for the serving cell c for each SPS PDSCH configuration s of a set of SPS PDSCH configurations configured to the UE for the serving cell c. The second set of HARQ-ACK codebooks may include the second HARQ-ACK codebook for the serving cell c for each SPS PDSCH configuration s of the set of SPS PDSCH configurations configured to the UE for the serving cell c.

Figure 8:
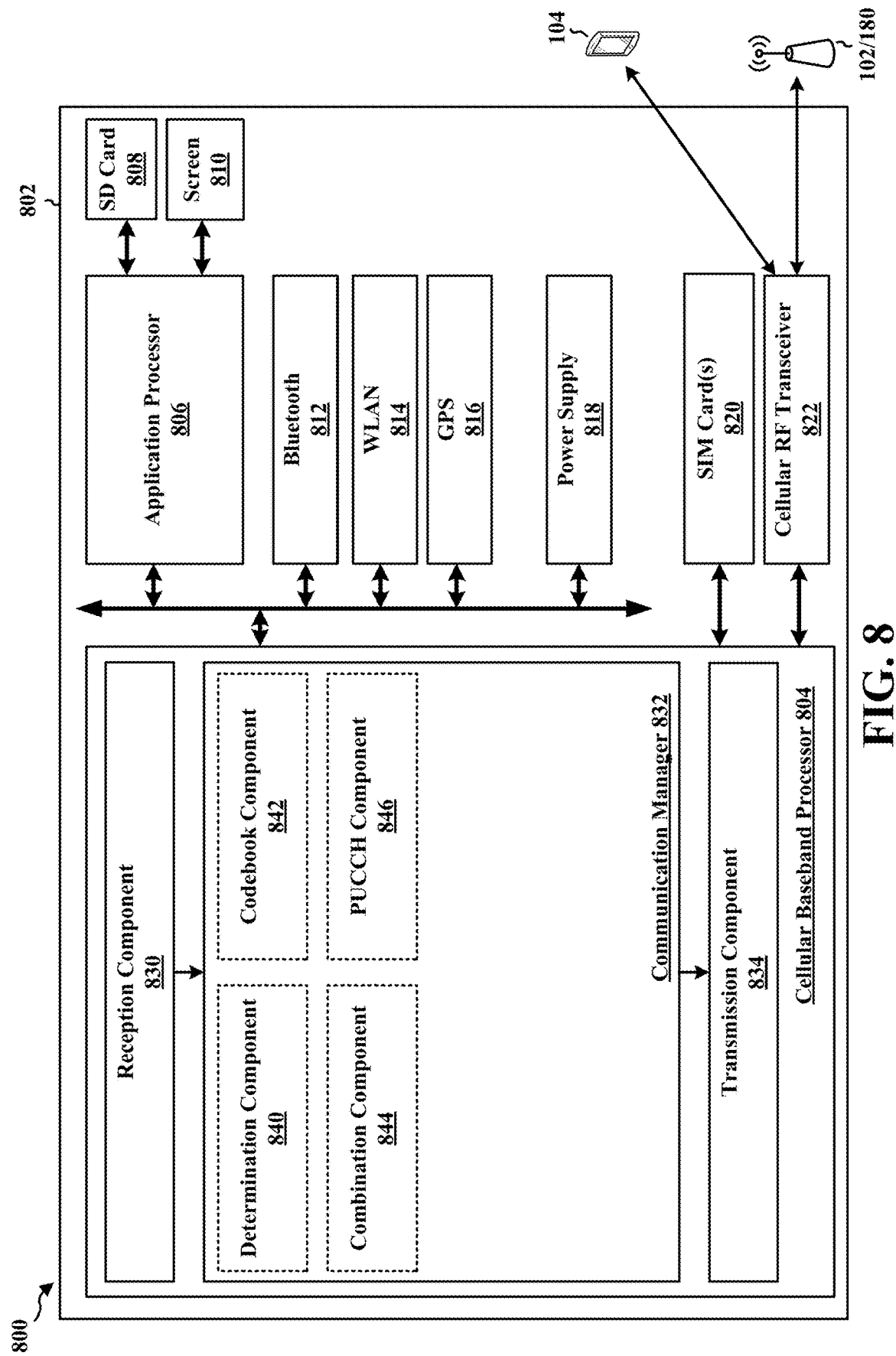
FIG. 8 is a diagram illustrating an example of a hardware implementation for an example apparatus.

At 714, the UE may transmit the feedback codebook. For example, 714 may be performed by PUCCH component 846 of apparatus 802. The UE may transmit the feedback codebook in the second PUCCH within the second slot FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes a determination component 840 that is configured to determine that a scheduled transmission of a first UCI in a first PUCCH is within a first slot, e.g., as described in connection with 602 of FIG. 6 or 702 of FIG. 7. The determination component 840 may be configured to configure a second UCI in a second PUCCH within a second slot, e.g., as described in connection with 604 of FIG. 6 or 704 of FIG. 7. The communication manager 832 further includes a codebook component 842 that is configured to generate a feedback codebook including the second UCI and the first UCI, e.g., as described in connection with 606 of FIG. 6 or 706 of FIG. 7. The codebook component 842 may be configured to generate a first HARQ-ACK codebook, e.g., as described in connection with 708 of FIG. 7. The codebook component 842 may be configured to generate a second HARQ-ACK codebook, e.g., as described in connection with 710 of FIG. 7. The communication manager 832 further includes a combination component 844 that is configured to combine the first HARQ-ACK codebook and the second HARQ-ACK codebook to generate the feedback codebook for transmission, e.g., as described in connection with 712 of FIG. 7. The communication manager 832 further includes a PUCCH component 846 configured to transmit the feedback codebook, e.g., as described in connection with 608 of FIG. 6 or 714 of FIG. 7.

The apparatus may include additional components that perform each of the blocks of the algorithm in the flowcharts of FIG. 6 or 7. As such, each block in the flowcharts of FIG. 6 or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for determining that a scheduled transmission of a first UCI in a first PUCCH is within a first slot including invalid symbols for the transmission. The apparatus includes means for configuring a second UCI in a second PUCCH within a second slot subsequent to the first slot. The apparatus includes means for generating a feedback codebook including the second UCI and the first UCI. The apparatus includes means for transmitting the generated feedback codebook in the second PUCCH within the second slot. The apparatus further includes means for generating a first HARQ-ACK codebook based on the first UCI multiplexed on the first PUCCH. The apparatus further includes means for generating a second HARQ-ACK codebook based on the second UCI multiplexed on the second PUCCH. The apparatus further includes means for combining the first HARQ-ACK codebook and the second HARQ-ACK codebook to generate the feedback codebook for transmission. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to determine that a scheduled transmission of a first UCI in a first PUCCH is within a first slot, wherein the scheduled transmission is cancelled; configure a second UCI in a second PUCCH within a second slot subsequent to the first slot; generate a feedback codebook including the second UCI and the first UCI; and transmit the feedback codebook in the second PUCCH within the second slot.

Aspect 2 is the apparatus of aspect 1, further including a transceiver coupled to the at least one processor.

Aspect 3 is the apparatus of any of aspects 1 and 2, further includes that the scheduled transmission of the first UCI in the first PUCCH is determined to be within the first slot in response to a received first SPS PDSCH.

Aspect 4 is the apparatus of any of aspects 1-3, further includes that the second UCI is transmitted in the second PUCCH within the second slot in response to a received second SPS PDSCH.

Aspect 5 is the apparatus of any of aspects 1-4, further includes that to generate the feedback codebook, the at least one processor configured to generate a first HARQ-ACK codebook based on the first UCI multiplexed on the first PUCCH; generate a second HARQ-ACK codebook based on the second UCI multiplexed on the second PUCCH; and combine the first HARQ-ACK codebook and the second HARQ-ACK codebook to generate the feedback codebook for transmission.

Aspect 6 is the apparatus of any of aspects 1-5, further includes that to combine the first HARQ-ACK codebook and the second HARQ-ACK codebook to generate the feedback codebook, the at least one processor configured to append the first HARQ-ACK codebook to an end of the second HARQ-ACK codebook.

Aspect 7 is the apparatus of any of aspects 1-6, further includes that to combine the first HARQ-ACK codebook and the second HARQ-ACK codebook to generate the feedback codebook, the at least one processor configured to append, for each serving cell c of a set of serving cells configured to the UE and for each SPS PDSCH configuration s of a set of SPS PDSCH configurations configured to the UE for the serving cell c, the first HARQ-ACK codebook for the serving cell c and the SPS PDSCH configurations to an end of the second HARQ-ACK codebook for the serving cell c and the SPS PDSCH configuration s.

Aspect 8 is the apparatus of any of aspects 1-7, further includes that to combine the first HARQ-ACK codebook and the second HARQ-ACK codebook to generate the feedback codebook, the at least one processor configured to append, for each serving cell c of a set of serving cells configured to the UE, a first set of HARQ-ACK codebooks for the serving cell c to an end of a second set of HARQ-ACK codebooks for the serving cell c, the first set of HARQ-ACK codebooks for the serving cell c including the first HARQ-ACK codebook for the serving cell c for each SPS PDSCH configuration s of a set of SPS PDSCH configurations configured to the UE for the serving cell c, the second set of HARQ-ACK codebooks for the serving cell c including the second HARQ-ACK codebook for the serving cell c for each SPS PDSCH configuration s of the set of SPS PDSCH configurations configured to the UE for the serving cell c.

Aspect 9 is the apparatus of any of aspects 1-8, further includes that to combine the first HARQ-ACK codebook and the second HARQ-ACK codebook to generate the feedback codebook, the at least one processor configured to append the first HARQ-ACK codebook to a beginning of the second HARQ-ACK codebook.

Aspect 10 is the apparatus of any of aspects 1-9, further includes that to combine the first HARQ-ACK codebook and the second HARQ-ACK codebook to generate the feedback codebook, the at least one processor configured to append, for each serving cell c of a set of serving cells configured to the UE and for each SPS PDSCH configuration s of a set of SPS PDSCH configurations configured to the UE for the serving cell c, the first HARQ-ACK codebook for the serving cell c and the SPS PDSCH configuration s to a beginning of the second HARQ-ACK codebook for the serving cell c and the SPS PDSCH configuration s.

Aspect 11 is the apparatus of any of aspects 1-10, further includes that to combine the first HARQ-ACK codebook and the second HARQ-ACK codebook to generate the feedback codebook, the at least one processor configured to append, for each serving cell c of a set of serving cells configured to the UE, a first set of HARQ-ACK codebooks to a beginning of a second set of HARQ-ACK codebooks, the first set of HARQ-ACK codebooks including the first HARQ-ACK codebook for the serving cell c for each SPS PDSCH configuration s of a set of SPS PDSCH configurations configured to the UE for the serving cell c, the second set of HARQ-ACK codebooks including the second HARQ-ACK codebook for the serving cell c for each SPS PDSCH configuration s of the set of SPS PDSCH configurations configured to the UE for the serving cell c.

Aspect 12 is the apparatus of any of aspects 1-11, further includes that to generate the feedback codebook, the at least one processor configured to generate the feedback codebook based on DL slots for SPS PDSCH reception with HARQ-ACK information multiplexed on the first PUCCH and with HARQ-ACK information multiplexed on the second PUCCH.

Aspect 13 is the apparatus of any of aspects 1-12, further includes that to generate the feedback codebook, the at least one processor configured to generate the feedback codebook based on DL slots including a first DL slot on which a first SPS PDSCH is received and a second DL slot on which a second SPS PDSCH is received, and based on HARQ-ACK information including the first UCI associated with the first DL slot and the second UCI associated with the second DL slot.

Aspect 14 is the apparatus of any of aspects 1-13, further includes that the scheduled transmission is canceled based on a collision with invalid symbols.

Aspect 15 is a method of wireless communication for implementing any of aspects 1-13.

Aspect 16 is an apparatus for wireless communication including means for implementing any of aspects 1-13.

Aspect 17 is a computer-readable medium storing computer executable code, where the code when executed by a processor causes the processor to implement any of aspects 1-13.

What is claimed is:

1. An apparatus for wireless communication to be performed by a user equipment (UE), comprising:
a memory; and
at least one processor coupled to the memory and configured to:
determine that a scheduled transmission of a first uplink control information (UCI) in a first physical uplink control channel (PUCCH) is cancelled within a first slot; and
transmit a combined feedback codebook in a second slot that is subsequent to the first slot, wherein the combined feedback codebook includes a second UCI and the first UCI in a second PUCCH transmission, wherein a first hybrid automatic repeat request acknowledgment (HARQ-ACK) codebook based on the first UCI and a second HARQ-ACK codebook based on the second UCI are combined to generate the combined feedback codebook, wherein the combined feedback codebook includes one of:
for each serving cell c of a set of serving cells configured to the UE and for each semi-persistent scheduling (SPS) physical downlink shared channel (PDSCH) configuration s of a set of SPS PDSCH configurations configured to the UE for the serving cell c, first HARQ-ACK codebook information for the serving cell c and the SPS PDSCH configuration s, of the scheduled transmission that was cancelled, appended to an end or a beginning of second HARQ-ACK codebook information of the second UCI for a corresponding serving cell c and a corresponding SPS PDSCH configuration s, or
for each serving cell c of the set of serving cells, a first set of HARQ-ACK codebook information for each SPS PDSCH configuration or each carrier of the serving cell c, of the scheduled transmission that was cancelled, appended to the end or the beginning of a second set of HARQ-ACK codebook information for each SPS PDSCH configuration or each carrier of the corresponding serving cell c.

2. The apparatus of claim 1, further comprising a transceiver coupled to the at least one processor.

3. The apparatus of claim 1, wherein the scheduled transmission of the first UCI in the first PUCCH is determined to be within the first slot in response to a received first semi-persistent scheduling (SPS) physical downlink shared channel (PDSCH).

4. The apparatus of claim 1, wherein the second UCI is transmitted in the second PUCCH transmission within the second slot in response to a received second semi-persistent scheduling (SPS) physical downlink shared channel (PDSCH).

5. The apparatus of claim 1, wherein to generate the combined feedback codebook, the at least one processor configured to:
generate the first HARQ-ACK codebook based on the first UCI multiplexed on the first PUCCH;
generate the second HARQ-ACK codebook based on the second UCI multiplexed on a second PUCCH; and
combine the first HARQ-ACK codebook and the second HARQ-ACK codebook to generate the combined feedback codebook for transmission.

6. The apparatus of claim 5, wherein to combine the first HARQ-ACK codebook and the second HARQ-ACK codebook to generate the combined feedback codebook, the at least one processor is configured to append, for each serving cell c of the set of serving cells configured to the UE and for each SPS PDSCH configuration s of the set of SPS PDSCH configurations configured to the UE for the serving cell c, the first HARQ-ACK codebook for the serving cell c and the SPS PDSCH configuration s to the end of the second HARQ-ACK codebook for the serving cell c and the SPS PDSCH configuration s.

7. The apparatus of claim 5, wherein to combine the first HARQ-ACK codebook and the second HARQ-ACK codebook to generate the combined feedback codebook, the at least one processor is configured to append, for each serving cell c of the set of serving cells configured to the UE, a first set of HARQ-ACK codebooks for the serving cell c to the end of a second set of HARQ-ACK codebooks for the serving cell c, the first set of HARQ-ACK codebooks for the serving cell c including the first HARQ-ACK codebook for the serving cell c for each SPS PDSCH configuration s of the set of SPS PDSCH configurations configured to the UE for the serving cell c, the second set of HARQ-ACK codebooks for the serving cell c including the second HARQ-ACK codebook for the serving cell c for each SPS PDSCH configuration s of the set of SPS PDSCH configurations configured to the UE for the serving cell c.

8. The apparatus of claim 5, wherein to combine the first HARQ-ACK codebook and the second HARQ-ACK codebook to generate the combined feedback codebook, the at least one processor is configured to append, for each serving cell c of the set of serving cells configured to the UE and for each SPS PDSCH configuration s of the set of SPS PDSCH configurations configured to the UE for the serving cell c, the first HARQ-ACK codebook for the serving cell c and the SPS PDSCH configuration s to the beginning of the second HARQ-ACK codebook for the serving cell c and the SPS PDSCH configuration s.

9. The apparatus of claim 5, wherein to combine the first HARQ-ACK codebook and the second HARQ-ACK codebook to generate the combined feedback codebook, the at least one processor is configured to append, for each serving cell c of the set of serving cells configured to the UE, a first set of HARQ-ACK codebooks to the beginning of a second set of HARQ-ACK codebooks, the first set of HARQ-ACK codebooks including the first HARQ-ACK codebook for the serving cell c for each SPS PDSCH configuration s of the set of SPS PDSCH configurations configured to the UE for the serving cell c, the second set of HARQ-ACK codebooks including the second HARQ-ACK codebook for the serving cell c for each SPS PDSCH configuration s of the set of SPS PDSCH configurations configured to the UE for the serving cell c.

10. The apparatus of claim 1, wherein the combined feedback codebook is based on downlink (DL) slots for semi-persistent scheduling (SPS) physical downlink shared channel (PDSCH) reception with hybrid automatic repeat request acknowledgement (HARQ-ACK) information multiplexed on the first PUCCH and with HARQ-ACK information multiplexed on a second PUCCH.

11. The apparatus of claim 1, wherein the combined feedback codebook is based on downlink (DL) slots including a first DL slot on which a first semi-persistent scheduling (SPS) physical downlink shared channel (PDSCH) is received and a second DL slot on which a second SPS PDSCH is received, and based on hybrid automatic repeat request acknowledgement (HARQ-ACK) information including the first UCI associated with the first DL slot and the second UCI associated with the second DL slot.

12. The apparatus of claim 1, wherein the combined feedback codebook includes first HARQ information bits of the scheduled transmission that was cancelled appended per carrier with second HARQ information bits of the second UCI.

13. The apparatus of claim 1, wherein the combined feedback codebook includes:
first HARQ information bits of the first UCI for each SPS configuration of a first carrier appended with second HARQ information from the second UCI for each SPS configuration of the first carrier, and
third HARQ information bits of the first UCI for each SPS configuration of a second carrier appended with fourth HARQ information from the second UCI for each SPS configuration of the second carrier.

14. The apparatus of claim 1, wherein the combined feedback codebook includes first HARQ information bits of the scheduled transmission that was cancelled appended per carrier and per SPS configuration with second HARQ information bits of the second UCI.

15. The apparatus of claim 1, wherein the scheduled transmission is canceled based on a collision with invalid symbols.

16. A method of wireless communication to be performed by a user equipment (UE), comprising:
determining that a scheduled transmission of a first uplink control information (UCI) in a first physical uplink control channel (PUCCH) is cancelled within a first slot; and
transmitting a combined feedback codebook in a second slot that is subsequent to the first slot, wherein the combined feedback codebook includes a second UCI and the first UCI in a second PUCCH transmission, wherein a first hybrid automatic repeat request acknowledgment (HARQ-ACK) codebook based on the first UCI and a second HARQ-ACK codebook based on the second UCI are combined to generate the combined feedback codebook, wherein the combined feedback codebook includes one of:
for each serving cell c of a set of serving cells configured to the UE and for each semi-persistent scheduling (SPS) physical downlink shared channel (PDSCH) configuration s of a set of SPS PDSCH configurations configured to the UE for the serving cell c, first HARQ-ACK codebook information for the serving cell c and the SPS PDSCH configuration s, of the scheduled transmission that was cancelled, appended to an end or a beginning of second HARQ-ACK codebook information of the second UCI for a corresponding serving cell c and a corresponding SPS PDSCH configuration s, or for each serving cell c of the set of serving cells, a first set of HARQ-ACK codebook information for each SPS PDSCH configuration or each carrier of the serving cell c, of the scheduled transmission that was cancelled, appended to the end or the beginning of a second set of HARQ-ACK codebook information for each SPS PDSCH configuration or each carrier of the corresponding serving cell c.

17. The method of claim 16, wherein the scheduled transmission of the first UCI in the first PUCCH is determined to be within the first slot in response to a received first semi-persistent scheduling (SPS) physical downlink shared channel (PDSCH).

18. The method of claim 16, wherein the second UCI is transmitted in the second PUCCH transmission within the second slot in response to a received second semi-persistent scheduling (SPS) physical downlink shared channel (PDSCH).

19. The method of claim 16, wherein the generating the combined feedback codebook comprises:
generating the first HARQ-ACK codebook based on the first UCI multiplexed on the first PUCCH;
generating the second HARQ-ACK codebook based on the second UCI multiplexed on a second PUCCH; and
combining the first HARQ-ACK codebook and the second HARQ-ACK codebook to generate the combined feedback codebook for transmission.

20. The method of claim 19, wherein the combining the first HARQ-ACK codebook and the second HARQ-ACK codebook to generate the combined feedback codebook comprises appending, for each serving cell c of the set of serving cells configured to the UE and for each SPS PDSCH configuration s of the set of SPS PDSCH configurations configured to the UE for the serving cell c, the first HARQ-ACK codebook for the serving cell c and the SPS PDSCH configuration s to the end of the second HARQ-ACK codebook for the serving cell c and the SPS PDSCH configuration s.

21. The method of claim 19, wherein the combining the first HARQ-ACK codebook and the second HARQ-ACK codebook to generate the combined feedback codebook comprises appending, for each serving cell c of the set of serving cells configured to the UE, a first set of HARQ-ACK codebooks for the serving cell c to the end of a second set of HARQ-ACK codebooks for the serving cell c, the first set of HARQ-ACK codebooks for the serving cell c including the first HARQ-ACK codebook for the serving cell c for each SPS PDSCH configuration s of the set of SPS PDSCH configurations configured to the UE for the serving cell c, the second set of HARQ-ACK codebooks for the serving cell c including the second HARQ-ACK codebook for the serving cell c for each SPS PDSCH configuration s of the set of SPS PDSCH configurations configured to the UE for the serving cell c.

22. The method of claim 19, wherein the combining the first HARQ-ACK codebook and the second HARQ-ACK codebook to generate the combined feedback codebook comprises appending, for each serving cell c of the set of serving cells configured to the UE and for each SPS PDSCH configuration s of the set of SPS PDSCH configurations configured to the UE for the serving cell c, the first HARQ-ACK codebook for the serving cell c and the SPS PDSCH configuration s to the beginning of the second HARQ-ACK codebook for the serving cell c and the SPS PDSCH configuration s.

23. The method of claim 19, wherein the combining the first HARQ-ACK codebook and the second HARQ-ACK codebook to generate the combined feedback codebook comprises appending, for each serving cell c of the set of serving cells configured to the UE, a first set of HARQ-ACK codebooks to the beginning of a second set of HARQ-ACK codebooks, the first set of HARQ-ACK codebooks including the first HARQ-ACK codebook for the serving cell c for each SPS PDSCH configuration s of the set of SPS PDSCH configurations configured to the UE for the serving cell c, the second set of HARQ-ACK codebooks including the second HARQ-ACK codebook for the serving cell c for each SPS PDSCH configuration s of the set of SPS PDSCH configurations configured to the UE for the serving cell c.

24. The method of claim 16, wherein the combined feedback codebook is based on downlink (DL) slots for semi-persistent scheduling (SPS) physical downlink shared channel (PDSCH) reception with hybrid automatic repeat request acknowledgement (HARQ-ACK) information multiplexed on the first PUCCH and with HARQ-ACK information multiplexed on the second PUCCH transmission.

25. The method of claim 16, wherein the combined feedback codebook is based on downlink (DL) slots including a first DL slot on which a first semi-persistent scheduling (SPS) physical downlink shared channel (PDSCH) is received and a second DL slot on which a second SPS PDSCH is received, and based on hybrid automatic repeat request acknowledgement (HARQ-ACK) information including the first UCI associated with the first DL slot and the second UCI associated with the second DL slot.

26. The method of claim 16, wherein the scheduled transmission is canceled based on a collision with invalid symbols.

27. An apparatus for wireless communication to be performed by a user equipment (UE), comprising:
means for determining that a scheduled transmission of a first uplink control information (UCI) in a first physical uplink control channel (PUCCH) is cancelled within a first slot; and
means for transmitting a combined feedback codebook in a second slot that is subsequent to the first slot, wherein the combined feedback codebook includes a second UCI and the first UCI in a second PUCCH transmission, wherein a first hybrid automatic repeat request acknowledgment (HARQ-ACK) codebook based on the first UCI and a second HARQ-ACK codebook based on the second UCI are combined to generate the combined feedback codebook, wherein the combined feedback codebook includes one of:
for each serving cell c of a set of serving cells configured to the UE and for each semi-persistent scheduling (SPS) physical downlink shared channel (PDSCH) configuration s of a set of SPS PDSCH configurations configured to the UE for the serving cell c, first HARQ-ACK codebook information for the serving cell c and the SPS PDSCH configuration s, of the scheduled transmission that was cancelled, appended to an end or a beginning of second HARQ-ACK codebook information of the second UCI for a corresponding serving cell c and a corresponding SPS PDSCH configuration s, or
for each serving cell c of the set of serving cells, a first set of HARQ-ACK codebook information for each SPS PDSCH configuration or each carrier of the serving cell c, of the scheduled transmission that was cancelled, appended to the end or the beginning of a second set of HARQ-ACK codebook information for each SPS PDSCH configuration or each carrier of the corresponding serving cell c.

28. The apparatus of claim 27, wherein the means for generating the feedback codebook is configured to:
- generate the first HARQ-ACK codebook based on the first UCI multiplexed on the first PUCCH;
- generate the second HARQ-ACK codebook based on the second UCI multiplexed on a second PUCCH; and
- combine the first HARQ-ACK codebook and the second HARQ-ACK codebook to generate the combined feedback codebook for transmission.

29. A non-transitory computer-readable medium storing computer executable code, the code when executed by a processor cause the processor to:
- determine that a scheduled transmission of a first uplink control information (UCI) in a first physical uplink control channel (PUCCH) is cancelled within a first slot; and
- transmit a combined feedback codebook in a second slot that is subsequent to the first slot, wherein the combined feedback codebook includes a second UCI and the first UCI in a second PUCCH transmission, wherein a first hybrid automatic repeat request acknowledgment (HARQ-ACK) codebook based on the first UCI and a second HARQ-ACK codebook based on the second UCI are combined to generate the combined feedback codebook, wherein the combined feedback codebook includes one of:
- for each serving cell c of a set of serving cells configured to a user equipment (UE) and for each semi-persistent scheduling (SPS) physical downlink shared channel (PDSCH) configuration s of a set of SPS PDSCH configurations configured to the UE for the serving cell c, first HARQ-ACK codebook information for the serving cell c and the SPS PDSCH configuration s, of the scheduled transmission that was cancelled, appended to an end or a beginning of second HARQ-ACK codebook information of the second UCI for a corresponding serving cell c and a corresponding SPS PDSCH configuration s, or
- for each serving cell c of the set of serving cells, a first set of HARQ-ACK codebook information for each SPS PDSCH configuration or each carrier of the serving cell c, of the scheduled transmission that was cancelled, appended to the end or the beginning of a second set of HARQ-ACK codebook information for each SPS PDSCH configuration or each carrier of the corresponding serving cell c.

\* \* \* \* \*